United States Patent
Vaswani et al.

(10) Patent No.: US 8,364,846 B2
(45) Date of Patent: Jan. 29, 2013

(54) METHOD AND SYSTEM OF PROVIDING IP-BASED PACKET COMMUNICATIONS WITH IN-PREMISIS DEVICES IN A UTILITY NETWORK

(75) Inventors: Raj Vaswani, Portola Valley, CA (US); George Flammer, III, Cupertino, CA (US); James Pace, San Francisco, CA (US); Jay Ramasastry, Reno, NV (US)

(73) Assignee: Silver Spring Networks, Inc., Redwood City, CA (US)

( * ) Notice: Subject to any disclaimer, the term of this patent is extended or adjusted under 35 U.S.C. 154(b) by 1089 days.

(21) Appl. No.: 11/807,176

(22) Filed: May 24, 2007

(65) Prior Publication Data

US 2008/0186202 A1    Aug. 7, 2008

Related U.S. Application Data

(60) Provisional application No. 60/899,328, filed on Feb. 2, 2007.

(51) Int. Cl.
G06F 15/16 (2006.01)
(52) U.S. Cl. ...................................... 709/245
(58) Field of Classification Search .................. 709/245; 370/254, 395.52, 401
See application file for complete search history.

(56) References Cited

U.S. PATENT DOCUMENTS

| | | | |
|---|---|---|---|
| 6,816,706 B1 | 11/2004 | Hohnstein et al. | |
| 6,885,309 B1 | 4/2005 | Van Heteren | |
| 2004/0071148 A1 | 4/2004 | Ozaki et al. | |
| 2004/0196783 A1 | 10/2004 | Shinomiya et al. | |
| 2004/0218616 A1* | 11/2004 | Ardalan et al. | 370/401 |
| 2004/0254999 A1 | 12/2004 | Bulleit et al. | |
| 2005/0018677 A1 | 1/2005 | Lee et al. | |
| 2005/0043059 A1 | 2/2005 | Petite et al. | |
| 2005/0055432 A1 | 3/2005 | Rodgers | |
| 2005/0176473 A1* | 8/2005 | Melpignano | 455/574 |
| 2005/0201300 A1* | 9/2005 | Bridgelall | 370/254 |
| 2005/0281207 A1 | 12/2005 | Lee et al. | |
| 2006/0203721 A1 | 9/2006 | Hsieh et al. | |
| 2006/0209844 A1* | 9/2006 | Carpenter et al. | 370/395.52 |
| 2007/0019586 A1 | 1/2007 | Nanda et al. | |
| 2007/0258473 A1 | 11/2007 | Ruffino et al. | |
| 2008/0189415 A1* | 8/2008 | Vaswani et al. | 709/226 |

FOREIGN PATENT DOCUMENTS

| | | |
|---|---|---|
| EP | 1631009 A1 | 3/2006 |
| WO | WO 98/26548 A1 | 6/1998 |

OTHER PUBLICATIONS

Sakane, S. et al., "A translation method between 802.15.4 nodes and IPv6 nodes," Applications and the Internet Workshops, 2006. Saint Workshops 2006. International Symposium in Phoenix, AZ, USA Jan. 23-27, 2006, Piscataway, NJ, USA, IEEE Jan. 23, 2006, pp. 34-37, XP010890167 ISBN: 978-0-7695-2510-5 abstract p. 36, left-hand column, paragraph 2-4.
International Search Report & Written Opinion dated Jun. 20, 2008 from corresponding PCT Application No. PCT/US2008/001165.
Singapore Search and Examination Report, dated Jan. 5, 2011.
Office Action mailed on Sep. 17, 2009 from related U.S. Appl. No. 11/807,177.

(Continued)

*Primary Examiner* — Brian P Whipple
(74) *Attorney, Agent, or Firm* — Buchanan Ingersoll & Rooney PC

(57) ABSTRACT

One example embodiment provides a method and system where a node in a utility network assigns an IP network address to an in-premise device which communicates to the utility node over an in-premise network which is not IP based. The utility node proxies the assigned IP address to the utility network, allowing other nodes on the utility network to address and communicate with the in-premise device.

34 Claims, 13 Drawing Sheets

OTHER PUBLICATIONS

Office Action mailed on Apr. 14, 2010 from related U.S. Appl. No. 11/807,177.
International Search Report & Written Opinion from corresponding PCT Application No. PCT/US2008/001109 dated Jul. 3, 2008 from related U.S. Appl. No. 11/807,177.
Office Action mailed on Jul. 29, 2009 from related U.S. Appl. No. 11/807,176.
Office Action mailed on Mar. 9, 2010 from related U.S. Appl. No. 11/807,185.
International Search Report and Written Opinion dated Sep. 26, 2008 from corresponding PCT International Application No. PCT/US2008/001166 from related U.S. Appl. No. 11/807,185.
Thompson, Nathanael et al., "Flow Scheduling for End-host Multihoming" INFOCOM 2006. 25th IEEE International Conference on Computer Communication, Apr. 1, 2006, pp. 1-2, XP031072237, ISBN: 978-1-4244-0221-2.
Silverajan, Bilhanan et al., "IPv6 Experiments in Deploying and Accessing Services from Home Networks," 2006 Asia Pacific Conference on Communication, IEEE, PI, Aug. 1, 2006, pp. 1-5, XP031024172, ISBN: 978-1-4244-0573-2.
Bagnulo, Marcelo et al., "Traffic Engineering in Multihomed Sites," 10th IEEE Symposium on Computers and Communications Proceedings. IEEE Computer Society, Jun. 27-30, 2005, pp. 495-5000, XP002496193, Los Alamitos, CA, USA.
Pentikainen, Heikki, "Home Services Top of IPv6" Internet Citation [online] Mar. 24, 2004, pp. 1-14, XP002482969. Retrieved from the Internet: URL:http://www/ficora.fi/attachments/suomi__A)L/1145442469261/Files/CurrentFile/IPv6_pentkainen.pdf> [Retrieved on Jun. 4, 2008].

* cited by examiner

METHOD AND SYSTEM OF PROVIDING IP-BASED PACKET COMMUNICATIONS WITH IN-PREMISIS DEVICES IN A UTILITY NETWORK

RELATED APPLICATIONS

The present application claims priority to U.S. Provisional Patent Application Ser. No. 60/899,328 entitled "SYSTEM & METHOD OF COMMUNICATIONS FOR UTILITY & HOME NETWORK SERVICES USING IPV6 AND IP PROTOCOL SUITE" filed Feb. 2, 2007.

BACKGROUND

1. Field of the Invention

The field of the invention relates generally to systems for controlling and delivering commodities, and more particular to IP-based packet communication systems for monitoring, controlling, and delivering commodities.

2. Related Background

Automated Meter Reading (AMR) systems and Automated Meter Infrastructure Systems (AMI) provide services and capabilities to monitor and/or report the usage (or consumption) of a commodity, such as water, electricity, gas, etc. Such systems provide communication between a commodity meter and one or more systems to report, bill, etc. Commodity metering information, as well as other information, is typically reported from the network devices associated with the meters to the reporting and billing systems.

The present invention seeks to overcome the limitations of conventional utility networks.

SUMMARY

The present invention provides a system and method for IP-based communication with in-premise devices in a utility network. A node within the utility network may associate or assign one or more network addresses to an in-premise device. The in-premise network device may not be capable using IP protocols. The assigned network address is proxied to other devices in a communications network. Packets received by the utility node from the IP based communications network are sent to the in-premise device according to the association between the assigned IP address of the in-premise device and the network address of the in-premise device on the in-premise network.

DETAILED DESCRIPTION

The present invention is described in the context of a specific embodiment. This is done to facilitate the understanding of the features and principles of the present invention and the present invention is not limited to this embodiment. In particular, the present invention is described in the context of a system for remotely reading, controlling and managing electronic devices in a utility network. The present invention is applicable to other systems for network-based management of electronic devices and commodity meters.

The example embodiment provides for a network-based system and method of monitoring and controlling a utility meter in a utility network.

Figure 1:
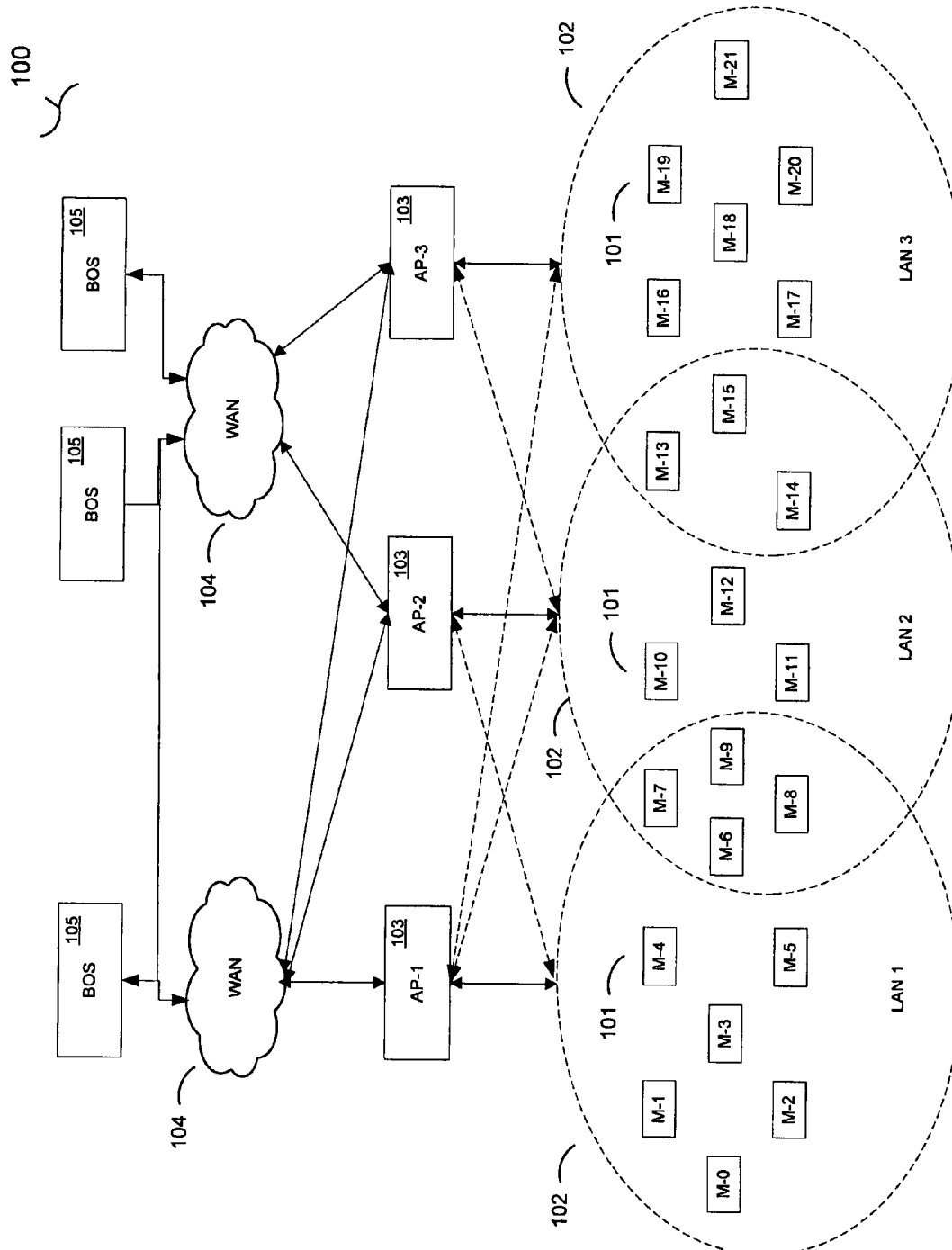
FIG. 1 is a generalized block diagram of a computer-based system that may be used to implement the present invention, according to one embodiment of the invention.

FIG. 1 is a generalized block diagram of a utility network 100 that may be used to implement embodiments of the present invention. Utility network 100 may include one or more electronic devices 101. In a preferred embodiment, the electronic devices 101 may be connected over a wireless local area network (LAN) 102. In the example of a utility network, the LAN may be a neighborhood area network (NAN) corresponding to a neighborhood or service area for the utility. As shown in the example embodiment, multiple LANs may be used, which may or may not overlap, such that a given electronic device can be connected to (or be part of) only one wireless LAN or multiple wireless LANs. The electronic devices may be any type of electronic device. Examples of electronic devices include utility nodes, which may include a utility meter or may connect to a utility meter. A utility meter is a device which is capable of measuring a metered quantity, typically a commodity like electricity, water, natural gas, etc. Utility nodes which connect to a utility meter may include a network interface card (NIC) for communicating on a network, and may include one or more RF transceivers for communicating on one or more wireless LANs. Other examples of electronic devices include communication devices, such as set top boxes (as may be used in cable television or satellite television delivery), household appliances (e.g. refrigerator, heater, light(s), cooking appliances, etc.), computers or computing devices (e.g. game consoles, storage devices, PCs, servers, etc.) networking devices such as relay, gateway, access point, router, or other networking devices, phones or cell phones, battery storage device, transportation devices, transportation vehicles (for example: an electric or hybrid car or other vehicle), entertainment devices (e.g. TVs, DVD players, set top boxes, gaming consoles, etc.), or other devise which may be found in a home, business, roadway or parking lot, or other location. Relays may handle communication between electronic devices 101 and the wireless LAN 102. For example, a relay could provide communication between the electronic device and the infrastructure of the wireless network. Unless otherwise noted, other devices in the network such as meters, electronic devices, gateways, etc. may also perform as relays, and relays may perform the functions of other devices or software on the network.

The wireless LAN 102 may be any type of wireless network, and may use any frequency, communications channel or communications protocol.

The LANs 102 are typically connected to one or more access points (AP) 103. A given LAN may be connected to only a single AP, or may be connected to two or more access points. The access points 103 may be connected to one or more wide area networks (WAN) 104. The WANs 104 may be connected to one or more back office systems (BOS) 105. The back office system may handle a variety of business or management tasks, including participation in the collection of metering information, managing metering devices, security for the network, or other functions as may be desired in an AMI network. Examples of back office systems include billing and accounting systems, proxy servers, outage detection systems (as may be used in a utility network), data storage systems, etc.

Nodes within the communications network, which may be a LAN or a WAN, or a combination of both, may communicate using one or more protocols. Nodes may include an electronic device, a relay, an access point, a router, or a BOS. Some nodes may be able to communicate using IPv6, some may be capable of communicating on IPv4, while some may be capable of communicating on either IPv4 or IPv6. Some nodes may be capable of encapsulating IPv6 packets in an IPv4 packet. Additionally, some nodes may be able to establish an IPv4 tunnel through an IPv6 network. The communication between nodes is described more fully below.

Assigning and Registering Network Addresses in Communication Networks

Figure 2:
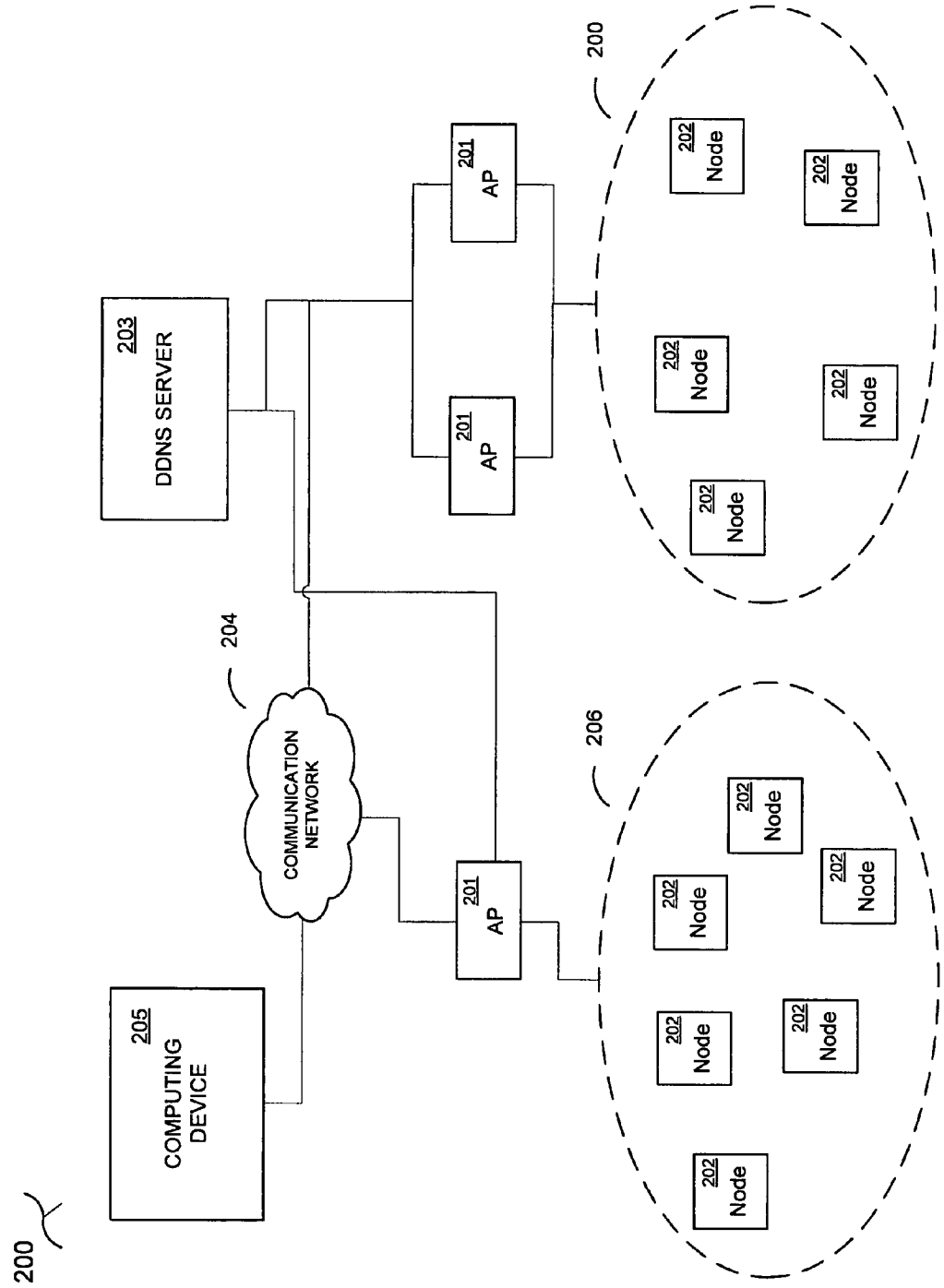
FIG. 2 is a generalized block diagram of a computer-based system that may be used to implement the present invention, according to one embodiment of the invention.

FIG. 2 is a generalized block diagram of a communications network including a LAN 200 and LAN 206. The LANs connect nodes 202 and access points 201. As shown, LAN 200 has two access points, and LAN 206 has once access point. A domain name server (DNS) 203 is connected to LAN 200 and LAN 206 through access point 201 to a communications network 204. In the presently preferred embodiment, DNS server 203 is capable of receiving and processing dynamic updates, thus providing a dynamic DNS service. Dynamic updating of DNS is according to IETF RFC 2136. Communications network 204 may be any type of communications network including, without limitation, a LAN, WAN, wireless, fixed line, private network, virtual private network, etc. In the presently preferred embodiment the communications network 204 is a wide area network, and may use one or more communications protocols such as IPv4 or IPv6. One or more computing devices 205 connect to the communications network 204. A message to a node 202 from the computing device 205 may be sent using a network address for the node. Computing device 205 may be any device, combination of devices, network management system, server, back office systems (BOS), computers, network devices, communications devices, software application or component which is capable of communicating with an access point or node via the communication network 204. A second LAN 206 may also be connected to the DNS server 203 and the communications network 204. A DNS server may be dedicated to a single LAN, or two or more LANs may share a DNS server. As shown, LAN 200 and LAN 206 do not overlap, in that none of the nodes, and none of access points shown are members of both LAN 200 and LAN 206. Alternate embodiments may have one or more LANs which overlap, with one or more nodes and/or access points common to one or more LANs. Alternate embodiments may have additional LANs, which may or may not overlap with each other. In the presently preferred embodiment, the network address of a node is obtained according to the process described in connection with FIG. 3 below.

DNS server 203 maintains network addresses for the nodes of the LAN network that it is associated with. As discussed above, a DNS server may be associated with one or more LANs and maintain the network addresses of nodes within one or more LANs. In one preferred embodiment, a node registered with several access points may have at least as many network addresses. The network addresses for the nodes may be included in the DNS server, or node route registry. Additionally, the DNS server may also maintain address allocation information such as node address allocation indicator (or node preference indicator). Table 1 below shows some of the information which may be included in maintaining network addresses for nodes in a LAN. The resource records maintained in the DNS server may include:

TABLE 1

| Resource Record Type | Node Network Address | Node Name | Node Address Preference Indicator |
|---|---|---|---|
| AAAA | ADDR1 | MAC1 | 50 |
|  | ADDR2 |  | 30 |
|  | ADDR2 |  | 10 |
| AAAA | ADDR4 | MAC2 | 80 |
| AAAA | ADDR5 | MAC3 | 44 |
|  | ADDR6 |  | 20 |

As illustrated in Table 1, in the presently preferred embodiment the node name is the MAC address of the node. However, other embodiments may use other names for the node, which may or may not include or be based upon the MAC address. Further, the Resource Record (RR) Type in table 1 may be an IPv6 type.

Information in the route registry may be updated according to multiple criteria, including periodically or in the event one or more criteria are satisfied.

For illustration purposes only one DNS server is shown and discussed below. Alternate embodiments, however, may use multiple DNS servers.

Alternate embodiments of the DNS resource records may include additional information or may exclude some of the information included in Table 1. Additionally, while Table 1 includes information on only three nodes, alternate embodiments of a route registry could have information on more or fewer nodes. While Table 1 includes up to three network addresses for a given node, alternate embodiments of a route registry may have any number of addresses per node.

Figure 3:
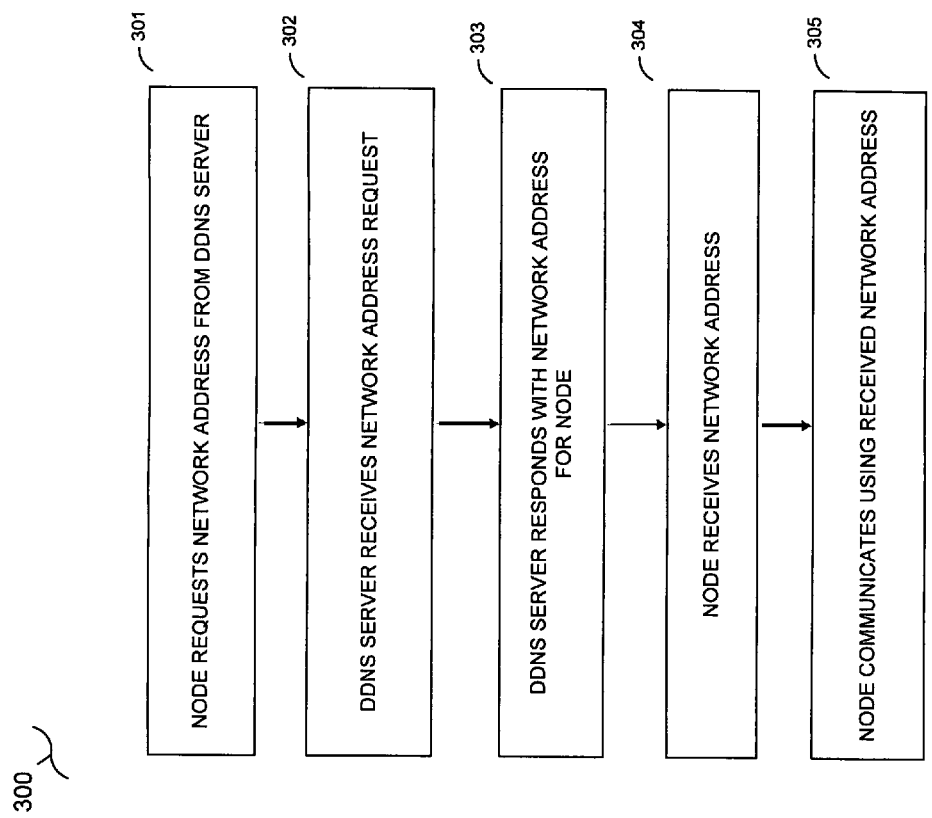
FIG. 3 is a generalized flow diagram illustrating a process for providing network addresses for nodes in a local area network, according to one possible embodiment.

FIG. 3 is a generalized flow diagram of a process 300 for obtaining a network address of a node. At step 301a node intending to send a packet or a message to a node makes a DNS resolution request to a DNS server. The DNS resolution request includes a node identifier, typically the node name. The node identifier may be any combination of letters, numbers, symbols or characters. As described above in connection with Table 1, in one presently preferred embodiment the node identifier is the MAC address of the intended node. As shown in Table 1, the source or requesting node includes information specifying the node's identifier, the node's network address, network address preference, etc. At step 302 the DNS server receives the DNS resolution request for the intended node. At step 303 the DNS server responds with a network address for the node associated with the node identifier. In the presently preferred embodiment, the network address is an IP address. In one presently preferred embodiment, the resource record AAAA relates to an IPv6 address. IPv4 resource record (RR) may be A, PTR, CNAME type. The DNS server may have more than one network address for a given node. For example, multiple IPv6 addresses may be associated with a given node (or access point, or BOS, or any other device on a network). If multiple addresses are associated with a given node, at step 302 the DNS server may provide all available network addresses for a particular RR. Alternatively, the DNS server may select a subset of the network addresses associated with the intended node. For example, the DNS server may choose one network address to include in the response to the electronic device. If a subset of network addresses associated with the intended node is selected the selection may be based upon a connection cost, upon a preset selection criteria, upon a policy (for example, the electronic device intending to exchange messages with the node, the type, size or priority of the message, some aspect of the use of the message by the node, or the nature of the network device e.g.: a server, a network management system, a billing system, an outage management system, a utility management system, etc.) or upon some other criteria. If multiple network addresses are provided in the DNS resolution response, the response may also include the corresponding node address preference indicators. At step 304 the node receives the DNS resolution response from the DNS server. At step 305 the node sends its message using a network address received from the DNS server.

The address used to send the message from the node and/or an electronic device to the intended node or electronic device may correspond to one or more access points. For example, in an IPv6 LAN the network address would typically be an IPv6 address. In the event there is more than one access point, the IPv6 prefix of the network address may be associated with a given access point. In this manner the IPv6 network address may allow a given access pint to be used to transmit a message to the network destination. If a node is in a LAN with multiple access points, the node may have more than one IPv6 address associated with the node.

EXAMPLE 1

Multi Ingress Using IPv6 Network Addressing

The present example has a given node with a node name of Node1. Node1 has two IPv6 network addresses associated with it. The route registry entry for Node1 may read:
DDNS Route Registry

| Node Name | Resource Record Type | Node Network Address | Node Address Preference Indicator |
|---|---|---|---|
| ... | ... | ... | ... |
| MAC1 | AAAA | 2001:2105:20ae:1:225:3400:208:aa03 | 50 |
|  |  | 2001:2105:20ae:2:225:3400:208:aa03 | 30 |
| ... | ... | ... | ... |

Node1 connects to a communications network through two access points: AP1 and AP2. AP1 is associated with IPv6 prefix 2001:2105:20ae:1::/64 and AP2 is associated with IPv6 prefix 2001:2105:20ae:2::/64. A network device, for example a back office system which manages outage detection, intending to send a message to Node1 may receive either network address associated with Node1 from the route registry of the DNS server (or may receive both network addresses). A message sent from the outage detection system to Node1 using the network address with prefix 2001:2105:20ae:2::/64 would be routed through AP2. A message sent from the outage detection system to Node1 using the network address with prefix 2001:2105:20ae:1::/64 would be routed through AP1.

Figure 4:
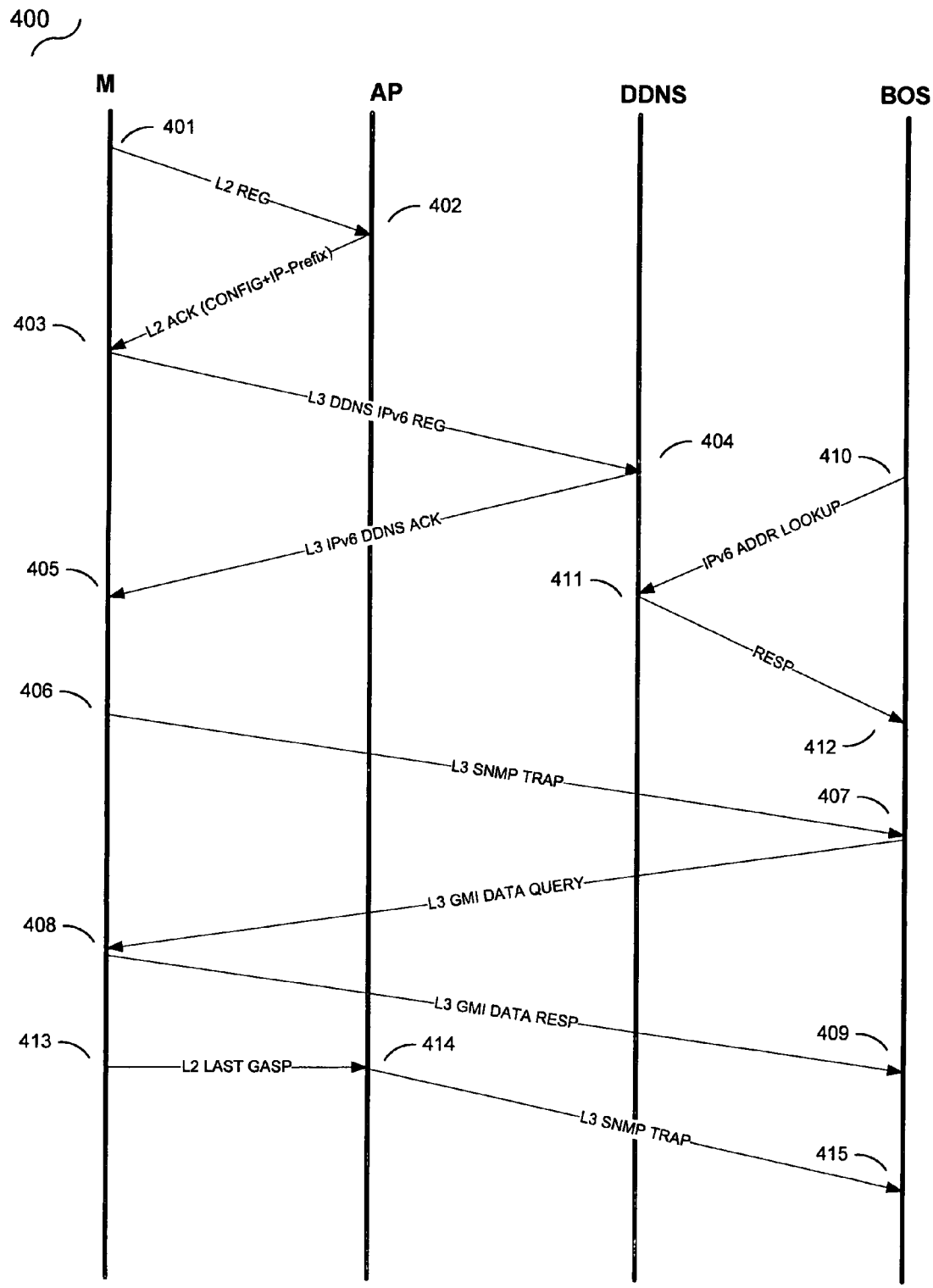
FIG. 4 is a generalized communications flow diagram of illustrating registering a nodal device with an access point, according to one embodiment of the invention.

FIG. 4 is a generalized communications flow diagram illustrating process 400 for registering a nodal device with an access point. Registering a nodal device to obtain a network address may apply to any format or protocol of network addresses. In one presently preferred embodiment, the LAN may be using IPv6 protocols (exclusively or in parallel with IPv4 protocols). For discussion purposes, process 400 will describe nodes of a wireless LAN using IPv6 network addresses. In a presently preferred embodiment, Node M initiates a discovery process and identifies its neighbor nodes and the access points of one or more LANs which provide egress and ingress. Node M may further initiate a routing analysis to identify a preferred set of one-hop neighbors who provide egress via one or more access points at the lowest path cost. It may then commence registration process with one or more APs and the affiliated DNS servers. At 401 node M sends a layer 2 registration message to an access point AP. At 402 the AP responds with a layer 2 acknowledgement message including an IPv6 prefix which is associated with the AP. Additionally, the acknowledgement message may include configuration information. In a presently preferred embodiment, the configuration information includes information which allows node M to register with a DNS server. In Another embodiment the AP may proxy the DNS request on behalf of node M. At 403 node M receives the layer 2 acknowledgement message and sends a layer 3 IPv6 registration message to the DNS. In one presently preferred embodiment, the IPv6 registration message to the DNS includes the IPv6 address for node M, which utilizes the IPv6 prefix received from the AP and a unique IPv6 "suffix", to complete an IPv6 address for node M. This is done consistent with stateless autoconfiguration steps of RFC 2462. In one preferred embodiment, the IPv6 suffix is based upon the MAC address of the node M. Alternate embodiments may use other suffixes not based upon the MAC address to create a unique IPv6 address for the node M. Note, the IPv6 address for node M need not be globally unique.

At 404 a layer 3 acknowledgement message is sent from the DNS to the node M and received by the node M at 405. The layer 3 acknowledgement message may include confirmation of the registration of node M's registration with the DNS server, and may include additional information.

While process 400 only shows the registration of one node with one access point, in the presently preferred embodiment all nodes would register with at least one access point. Additionally, in one presently preferred embodiment nodes would register with more than one access point on their LAN in the event there is more than one access point on the LAN associated with the node. A node may even register with all the access points on the LAN the node is associated with.

In the presently preferred embodiment, a given node may have more than one unique IPv6 address associated with the node. If, as described above, a node's IPv6 address is determined from the IPv6 prefix of an access point and a unique component (e.g., the MAC address of the node) then if the node registers with multiple access points the node will be associated with multiple unique IPv6 addresses. In this manner nodes may be multihomed.

Node M may send a layer 3 SNMP TRAP or INFORM message to a back office system BOS at 406. Alternatively, the DNS server may signal the BOS via SNMP. Preferably, the SNMP TRAP or INFORM message will include at least one IPv6 address of the node M (and may include multiple network addresses associated with node M). At 407 the BOS receives the SNMP TRAP or INFORM message and replies with a layer 3 message such as a GMI (Generic Management Interface) data query. GMI data query message may request information on node M. For example, if node M is a meter in a utility network, the GMI data query message may request information on the configuration settings of the meter, status of the meter, information on the metered commodity, etc. At 408 node M receives the data query message and sends a data response message. At 409 the BOS receives the data response message from node M.

The BOS may request the network address of a given node at any time. For example, if the BOS has not received a message from node M when a message was expected, the BOS may query node M. If the BOS does not already have the network address of node M, or, as in one presently preferred embodiment, if the network is configured to request a network address unless the BOS is responding to a message received, the BOS may perform a lookup (i.e. a DNS resolution request) with the DNS server. At 410 the BOS sends an IPv6 network address lookup message for node M to the DNS server. At 411 the DNS server responds to the BOS with an IPv6 address for node M to the BOS (if the DNS server has a network address for node M, otherwise the DNS server may respond that it does not have a network address for node M). The IPv6 address for node M is received at 412.

In the event the node is not registered, or if the BOS does not receive a network address for the node, the BOS may attempt to programmatically derive the IP address or may attempt to generate an IP address. The BOS may create an ad-hoc IPv6 address using the AP's IPv6 address and the node's MAC address (as described above). The BOS may also send an IPv6 message to the AP requesting the AP to forward a message to the node based upon the node according to the node's unique MAC identifier. Alternatively, the BOS may request the AP ping the node to determine the network address of the node and/or inquire into the results of the registration process.

In the event node M encounters a problem, for example loss of power, a security incident, a problem with its hardware or software, a network problem, etc., node M may send a message indicating a problem to the BOS (or to any device reachable by node M) such as an SNMP TRAP or INFORM message. In the event of a loss of power, the node M may send a "last gasp" message. At 413 node M sends a last gasp message to the AP. Typically, the later 2 last gasp message is very short with only the essential information to conserve node's and network's resources, so the message is received reliably by other neighbor nodes and the corresponding AP. At 414 the AP receives the last gasp message from node M, and in the presently preferred embodiment packs an SNMP TRAP or INFORM PDU (Protocol Data Unit or SNMP packet) with L2 "last gasp" messages and forwards them to the BOS which indicates the AP has received a last gasp message from node M.

EXAMPLE 2

Network Addressing for Transportation Nodes

Figure 5:
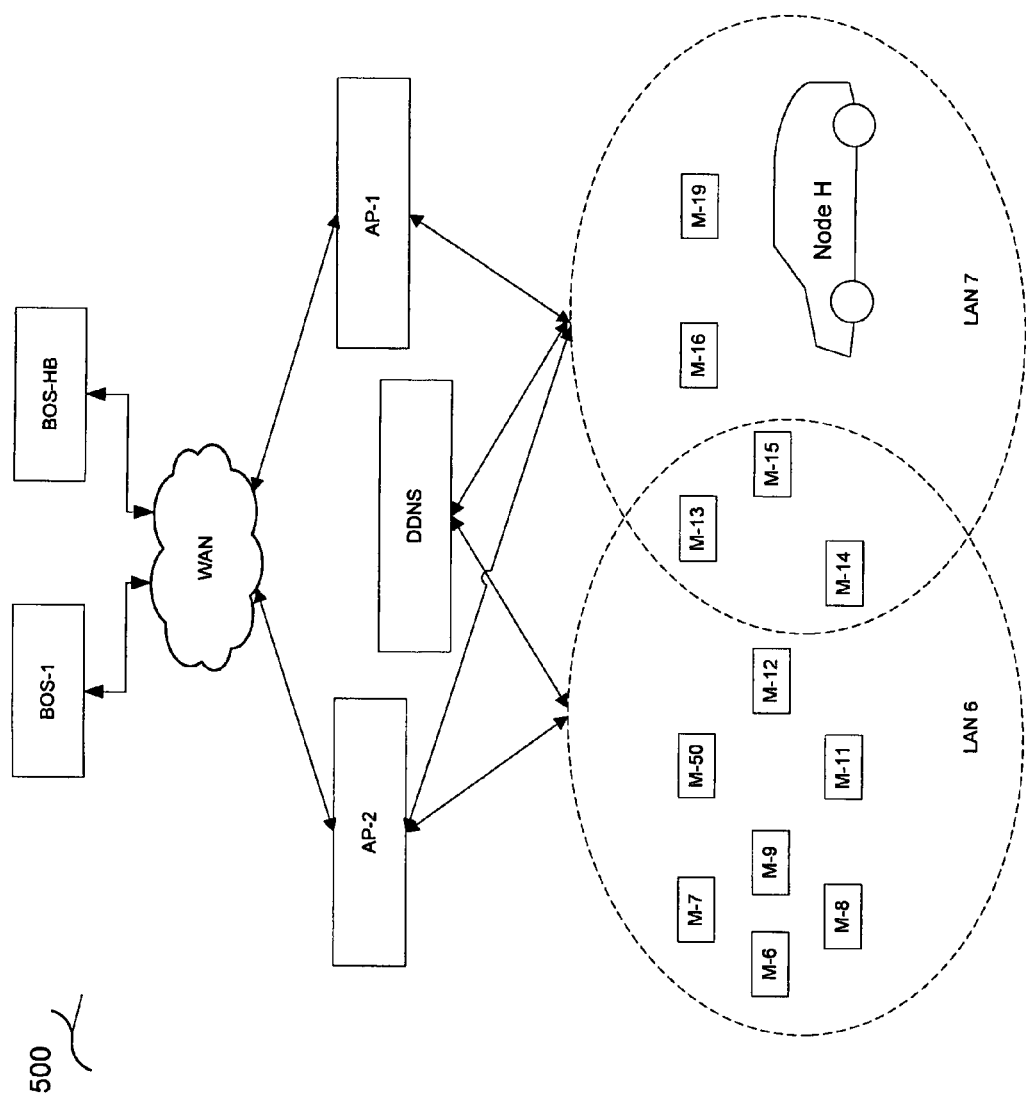
FIG. 5 is a generalized block diagram illustrating registering a rechargeable hybrid car with an access point, according to one embodiment of the invention.

The present example has a given node that is a transportation device as shown in FIG. 5. Specifically, Node H is a hybrid car which may have its batteries charged from an electric grid. Upon plugging Node H into an electrical outlet node H attempts to establish communication with an electrical utility billing BOS called BOS-HB. In the present example Node H is within the coverage area of LAN-7, a wireless communications network using the IPv6 protocol. Node H sends a layer 2 registration request message to at least one access point within LAN-7. AP1, an access point with LAN-7 responds with its IPv6 prefix, which is 4ea3. Node H uses the received prefix from AP1 to create a unique IPv6 address. Node H uses the MAC address of a network card in Node H, along with the IPv6 prefix from AP1, to create the unique IPv6 address. Node H sends a layer 3 registration message to a DNS server associated with LAN-7 and receives an acknowledgement from the DNS server. Node H also registers with a second access point on LAN-7 called AP2. AP1 and AP2 are both capable of communicating with BOS-HB through a communications network. AP2 sends Node-H its IPv6 prefix of 21ff, which Node H uses to create a second unique IPv6 address associated with AP2. Node H then sends an SNMP TRAP or INFORM message to BOS-HB indicating that it is on LAN-7. Additionally, the message to BOS-HB includes information to alert BOS-HB that Node H is currently connected to the electrical grid and receiving power to recharge the batteries of Node H. BOS-HB sends Node H messages to inquire into the electrical usage of Node H and also sends messages to check if Node H is still on the network. Prior to sending a message to Node H, BOS-HB performs a lookup of Node-H's network address with the DNS server. The DNS server, in responding to lookup requests corresponding to Node-H, may determine which of the two unique IP addresses associated with Node H to provide BOS-HB. In this example embodiment, the route registry of the DNS server includes a unique preference indicator associated with the IPv6 addresses corresponding to Node H. The preference indicator specifies that AP2 is preferred over AP1, as AP2 has a more reliable connection with AP2 than with AP1. Thus, the DNS server replies to BOS-HB with the network address associated with AP2. BOS-HB then uses the network address associated with AP2, which then routes messages to Node-H through AP2. In the event of a failure to deliver a message from BOS-HB to Node-H through AP2, BOS-HB (or another device on the network) may request and receive the next most preferred network address associated with Node-H, and resend the failed message using the next most preferred network address for Node-H. As the next most preferred network address for Node-H corresponds to AP1, the retry of the failed message is routed through AP1 to Node-H. In response to the failed delivery message to the network address associated with AP2, the DNS server may change the preference indicators associated with one or more network addresses associated with Node-H, and may also change the preference indicators of other nodes on according to one or more criteria (e.g. proximity to Node-H, dependence on AP2, dependence on Node-H, etc.). The request to change the preference indicator in the DDNS registry may originate from any one of Node-H, the BOS-HB, AP-1, AP-2.

Node H responds to the request from BOS-HB received from AP2 by sending a packet including the network address of Node H. If the included network address includes the prefix of AP1, the pack may be routed through AP1 to BOS-HB, thus allowing a network address to determine which access point, from among multiple access points, to use in egressing from LAN-7. Node H may select which of multiple network addresses associated with Node H to include in packet's header sent from Node H. By routing packets based upon the access point prefix included in the Node H, the egress point of the LAN may be selected, allowing control of egress in multi-egress embodiments.

As Node H is a mobile node capable of moving from one location to another (which may result in moving out of direct contact with a given AP, node or LAN), the AP may deregister a mobile node. For example, mobile nodes may be deregistered if they have not been in communication with the AP for a preset or configurable, period of time. Additionally, or alternatively, mobile nodes may send information to one or more APs not to deregister them, or policies at the AP may decide not to deregister a given mobile node based upon one or more characteristics.

System Components in Support of IPv6 Utility Networks

Utility networks capable of supporting communication using IPv6 addressing and protocols may use a variety of devices capable of communicating, preferably, using IPv6. In the presently preferred embodiment, system components such as a utility node, an access point, and a back office system would have IPv6 functional support integrated into the respective system component. Example preferred embodiments of IPv6 capable systems components are shown and described in connection with FIGS. 6, 7 and 8.

Figure 6:
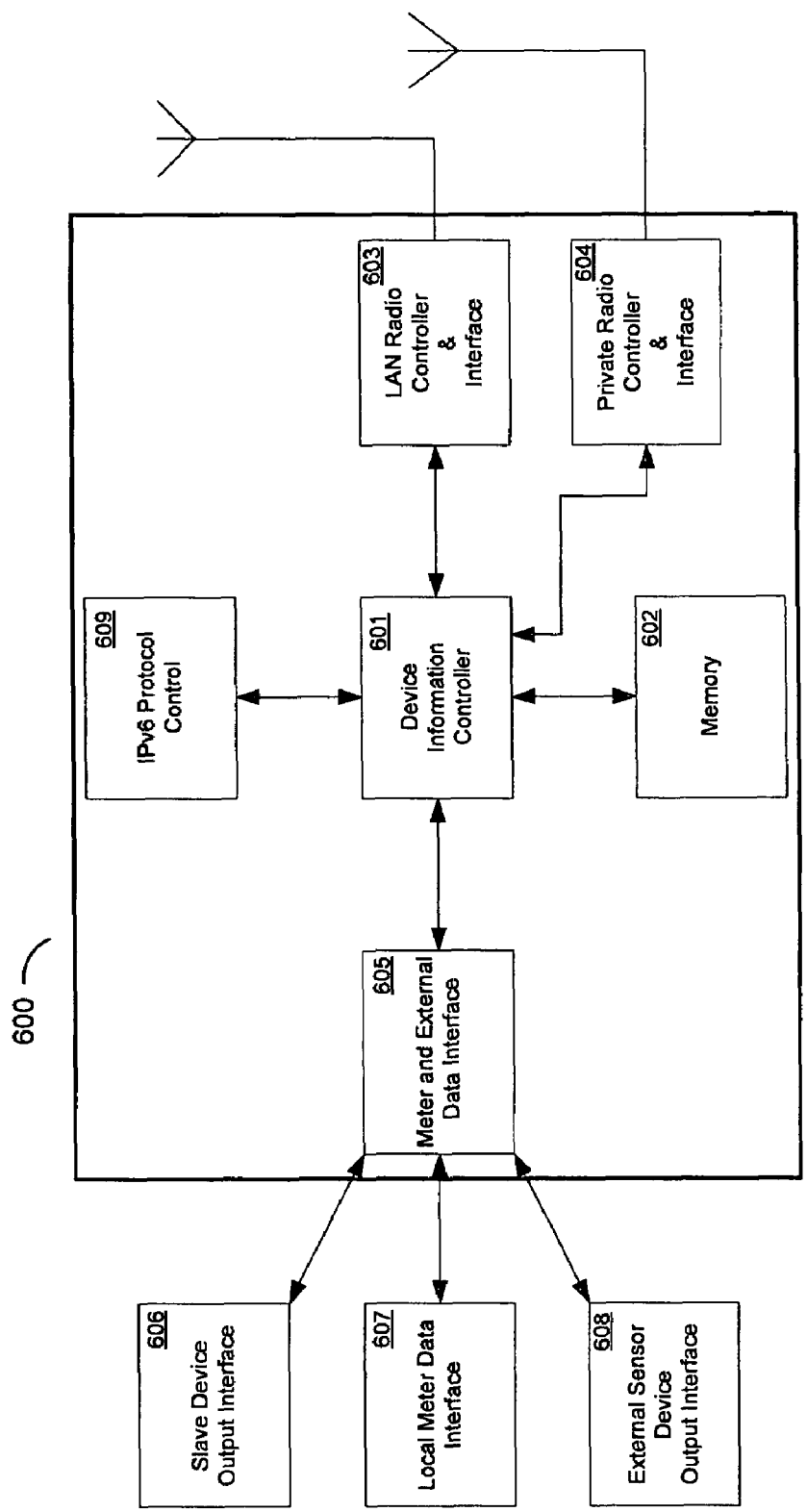
FIG. 6 is a generalized block diagram of a node as may be found in communications network, according to one embodiment of the invention.

FIG. 6 is a generalized block diagram of a node 600 as may be found in communications network 600 described above. In one preferred embodiment, node 600 may include a device information controller 601, memory 602, LAN radio controller and interface 603, private radio controller and interface 604, meter and external data interface 605, and IPv6 protocol controller 609. Meter and external data interface 605 may connect to a slave device 606, local meter data interface 607, and or an external sensor device output interface. IPv6 protocol controller 609 may receive and send IPv6 packets, and may also create or maintain IPv6 tunnels or encapsulate/de-encapsulate packets as needed.

While the example node 600 does not include a meter for metering a commodity, alternate embodiments may include metering capability.

While the example node 600 does not include radios such as a private network radio or LAN radio, alternate embodiments of the node may include one or more radios.

While example node 600 is described as a single device, alternate embodiments may use multiple computers, electronic devices or radios in implementing example node 600.

Figure 7:
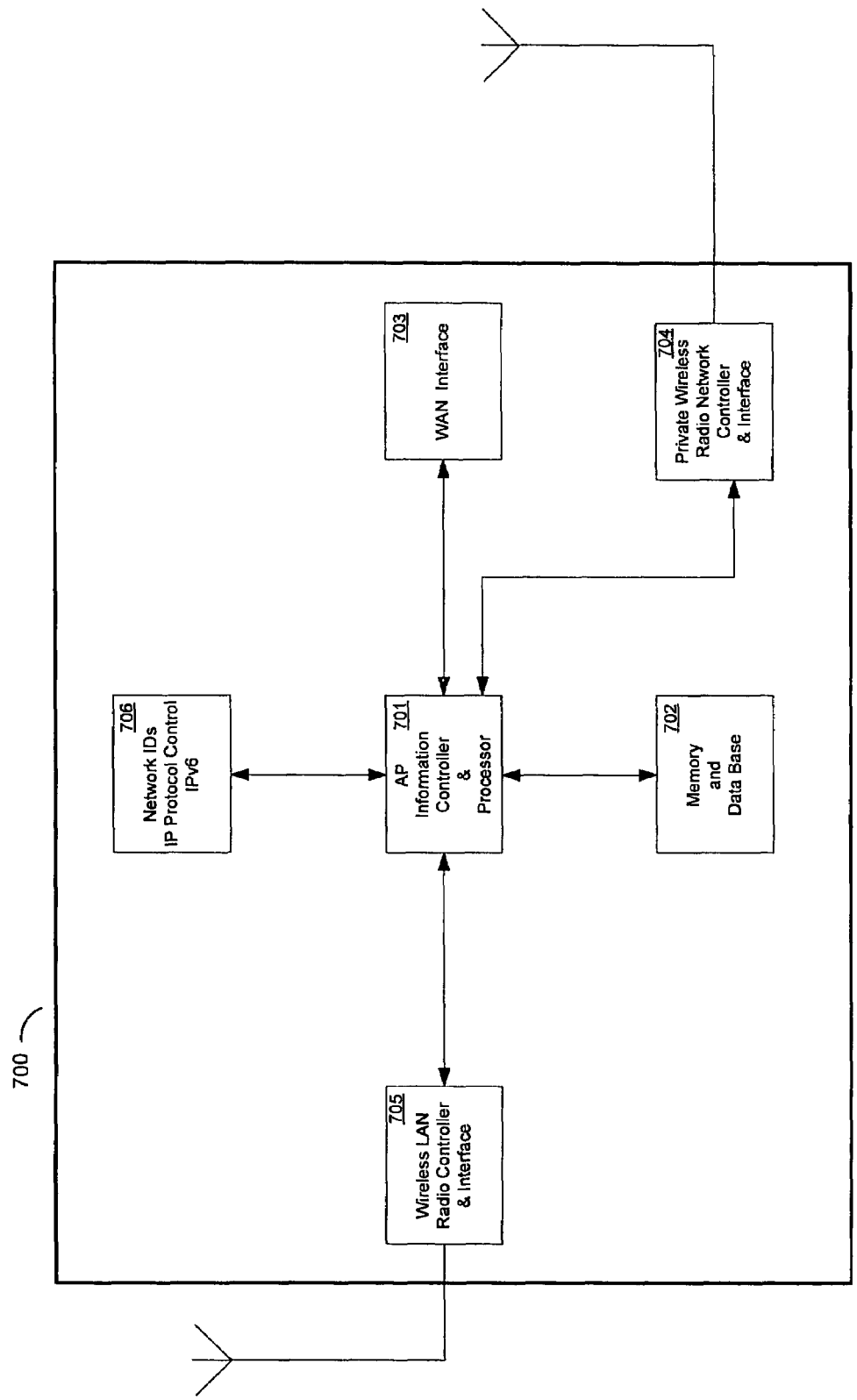
FIG. 7 is a generalized block diagram of an access point as may be found in a communications network, according to one embodiment of the invention.

FIG. 7 is a generalized block diagram of an access point 700 as may be found in communications network 600 described above. Access point 700, which may also act as a gateway to nodes in a network such as a wireless LAN, may include an access point information controller 701, memory 702, a WAN interface 703, a private wireless radio network controller 704, a wireless LAN radio controller and interface 705, and network IDs IPv6 protocol controller 706. The network IDs IPv6 protocol controller 706 may also include a tunnel broker, or a tunnel broker may be included separately from the router and 6-in-4 formatter in embodiments utilizing a tunnel broker.

While the example access point 700 does not include radios such as a private network radio, WAN or LAN radio, alternate embodiments of the access point may include one or more radios.

While the example access point 700 is distinct from a meter or other device in the network (e.g. a relay, etc.) alternate embodiments could combine the functionality of a node, meter, relay, or any other device or system in the network.

While access point 700 is described as a single device, alternate embodiments may use multiple computers, electronic devices or radios in implementing access point 700.

Figure 8:
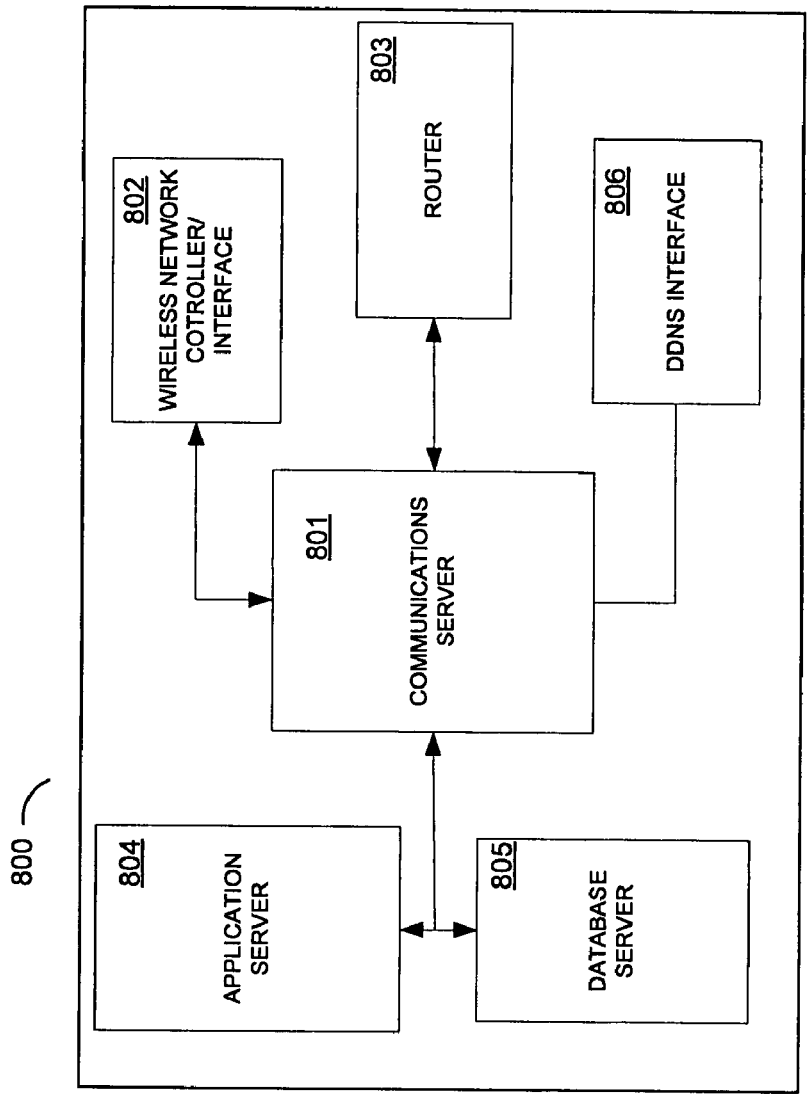
FIG. 8 is a generalized block diagram of back office system as may be found in a communications network, according to one embodiment of the invention.

FIG. 8 is a generalized block diagram of back office system 800 as may be found in communications network 500 described above. Back office system 800 may include a communications server 801, a wireless private network communications controller 802, a router and 6-in-4 formatter 803, an application server 804 and a database server 805. Wireless private network communications controller 802 may communicate with a private wireless network. The router and 6-in-4 formatter 803 may communicate with the WAN. The router and 6-in-4 formatter may also include a tunnel broker, or a tunnel broker may be included separately from the router and 6-in-4 formatter in embodiments utilizing a tunnel broker. The WAN may be the internet, an intranet, or any other type of wide area network. Application server may be any type of application which may be used in a utility network. Examples, without limitation, include billing applications, accounting applications, outage detection and/or management applications, configuration and or provisioning applications, network applications such as a proxy server, a DNS or DNS server, a storage, back-up and or recovery application, a customer interface application (for example, an interface application to allow a customer to control aspects associated with a node or to control aspects of a node), a node manager, a content management or delivery system, a communication manager or communication providing application, etc. Alternatively, the formatter may be a 6 to 4 formatter for IPv6 encapsulation.

While back office system 800 is described as a single entity, it may be implemented on one or more computers, for example on multiple servers in a data center. The described components of back office system 800 may be implemented on different computers, or may be implemented across multiple computers. Additionally, back office system 800 may be implemented across multiple computers in multiple locations or on multiple networks. Back office system 800 may also aggregate or include multiple applications. For example, a back office system may include both an accounting system as well as a customer billing system. As another example, back office system may include a billing system and a proxy server. Additional combinations of any number of applications may be included in additional alternate embodiments.

Utility Node Subnetworks

Figure 9:
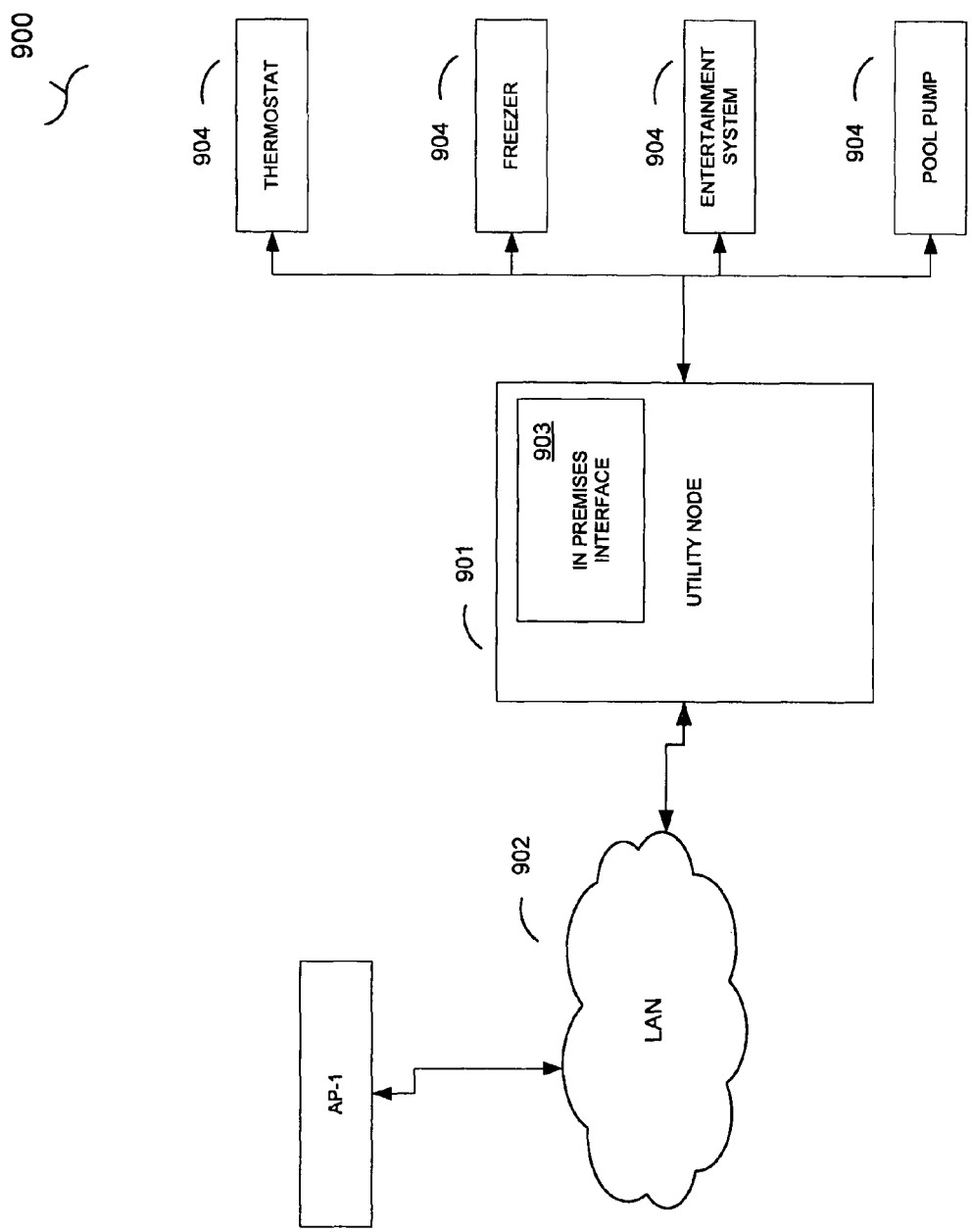
FIG. 9 is a generalized block diagram illustrating a sub-network of a utility node, according to one possible embodiment.

FIG. 9 is a generalized block diagram illustrating a utility node sub-network 900. Network 900 may include a utility node 901. The utility node may include a commodity meter, or may interface with a commodity meter. Utility node 901 is capable of communicating with a communications network 902. In one preferred embodiment, utility node 901 includes a wireless radio capable of communicating with a wireless LAN using IP protocols (IPv4 or IPv6). Utility node 901 also includes an in-premise device interface 903. In-premise device interface 903 connects to in-premise devices 904 to provide a communications link between the utility node and the in-premise devices. Additionally, the utility node may provide a communications link between the in premise devices 904 and the communications network 902 connected to the utility node.

In one presently preferred embodiment, the utility node in-premise device interface 903 assigns a network address to in premise devices which it is capable of communicating with. In one possible embodiment, the network address assigned by the in-premise device interface 903 is an IP address. Preferably, the network address assigned to an in-premise device is unique within communications network 902. The in-premise device interface 903 may also share, or allow sharing, of the network address assigned to an in-premise device outside of the subnet within the premise. Thus, in-premise devices are directly addressable from outside the sub-network of the premise. The utility node proxies the assigned IP address on behalf of the corresponding in-premise device, allowing other nodes in the communication network to communicate with the in-premise device using the assigned IP address. Example 3 illustrates this through one possible embodiment.

EXAMPLE 3

In-Premise Communication Using IPv6 Network Addressing

The present example is of a utility node with a node name of Node 31 Cedar Ave. Node 31 Cedar Ave is deployed in a residential unit (a home) and is capable of communicating with in-premise devices (devices within the home) through multiple protocols and communications technologies. For example, utility node 31 Cedar Ave may communicate with devices using ether a wireless personal area network (WPAN) or using PLC (Power line Carrier) communications with PLC capable devices connected to the home's power grid. The example home includes five in-premise devices, a thermostat communicating via WPAN, a pool pump communicating via WPAN, a freezer communicating via PLC, and a home entertainment system communicating via WPAN.

The WPAN may be any one, or any combination, of network technologies or standards including, without limitation, Bluetooth, ZigBee (IEEE 802.15.4), IrDA, UWB (IEEE 802.15.3), Dust TSMP, Insteon, other technologies based upon IEEE 802.15, etc.

Utility Node 31 Cedar Ave communicates wirelessly with a utility network using IPv6 communications protocols. The utility network includes other utility nodes and at least one access point, as well as a BOS for managing node 31 Cedar Ave.

Utility Node 31 Cedar Ave includes an electricity usage meter which monitors and reports the electrical usage of the home. Additionally, Node 31 Cedar Ave includes an interface for other commodity meters, which is connected to a natural gas meter which monitors and reports the natural gas usage of the home.

Node 31 Cedar Ave assigns an IPv6 address to each of these in-premise devices. Node 31 Cedar Ave shares the assigned IPv6 address for the thermostat, pool pump, freezer and entertainment system with communications network. Specifically, the network addresses of the in-premise devices are shared with an in-premise management portal which is connected to the utility network and which allows the homeowner to monitor and control the in-premise devices. The network addresses of one or more in-premise devices may also be proxied by Node 31 Cedar Ave within communications network or which may communicate through the communications network with Node 31 Cedar Ave.

Through the in-premise management portal the homeowner (or others) may communicate with the in-premise devices using the assigned IP address. Node 31 Cedar Ave receives packets intended for in-premise devices, identifies the intended device according to the assigned IP address, and forwards the payload of the packets to the intended device over the appropriate in-premise communication system (WPAN, PLC, etc.). Similarly, communication signals from the in-premise devise received over the in-premise communication system is input into the payload of a packet(s) and send to the in-premise management portal, including the network address assigned to the in-premise device.

The in-premise registry entry for the in-premise devices may read:
In-Premise Registry

| In-Premise Device Name | Assigned IPv 6 Network Address | In-Premise Communication Technology | Native Address |
|---|---|---|---|
| Thermostat | Address 1 | ZigBee | $Z_1$ |
| Freezer | Address 2 | PLC | $PLC_1$ |
| Pool Pump | Address 3 | ZigBee | $Z_2$ |
| Entertainment System | Address 4 | ZigBee | $Z_3$ |

Node 31 Cedar Ave uses the assigned network addresses and the in premise communication technology to allow communication between the in-premise devices and outside of premise communications networks.

In one preferred embodiment the utility node may also maintain an access control list (ACL) for in-premise devices. Using the ACL, the utility node allows access to an in-premise device according to the ACL. For example, the ACL may specify that a home security system may only allow access from a security portal. Any device or system attempting to communicate with the home security system will be denied access unless it provides the appropriate verification information specified in the ACL as corresponding to the security portal.

The utility node ACL may also specify service ports or network daemon names which are allowable for either, or both, inbound and outbound traffic.

In one presently preferred embodiment, the utility node may assign routable network addresses to in-premise devices. In premise devices may not be capable of using the network address, as in Example 3 above, where WPAN and PLC devices use their own network address and have assigned an IP address. Thus, the network address assigned the in-premise device is proxied by the utility node. In embodiments using IPv6, an access point may assign a portion of its allocated IPv6 addresses to the utility node. In turn, the utility node may allocate addresses to in premise devices from the IPv6 addresses assigned the utility node. In one preferred embodiment, the AP may allocate a block of continuous addresses to one or more utility nodes. The utility nodes may then assign any of the allocated addresses, or portions of them, to in-premises devices.

The network address assigned a device may be, partially or entirely, based upon the MAC address of the utility node communicating with the device, an access point, or the device itself.

Additionally or alternatively, rules or policies may be used to determine the allocation of addresses to in premise devices. Rules may be based upon the device type, device attributes, network technology or network protocol used by the device, the device's commodity usage type (e.g. electric, gas, water, etc.), the device's commodity usage history or characteristic (e.g. high usage, moderate usage, etc.), the premise or section of a premise the device is physically located in, or assigned attributes of the device (e.g. the importance of a device, the use of a device such as medical equipment, fire suppression equipment, security equipment, emergency response equipment, etc.), or upon attributes assigned by a user of the device or the owner/operator of the premise. Rules may also combine multiple factors listed above, for example considering the type of device, the physical premise, the electrical power consumption, and whether the device is related to security or emergency response.

Additionally or alternatively, some network addresses may be set aside for particular devices, uses, users, etc. For example, certain network addresses may be set aside for emergency personnel or their equipment. Thus, a mobile in-premise device of an emergency responder which appears on a given in-premise subnet may be assigned an address from a set-aside group of addresses for such devices of emergency responders. The address given from the group of address set aside may also be allocated according to a rule, for example assigning an address based upon the type of responder (police, fire, EMT, etc.) their affiliation or organization (department, precinct, etc.) the device type, or any other attribute of the organization, purpose, device, etc.

Example 4 illustrates one possible embodiment for implementing allocation of addresses to utility nodes and the assignment of allocated addresses to in-premise devices using utility nodes.

EXAMPLE 4

Assigning In-Premise IPv6 Network Addresses

A utility node with a node name of Meter HM is deployed in a residential unit (a home) and is capable of communicating with in-premise devices (devices within the home or neighboring homes) through multiple protocols and communications technologies. Additionally, Meter HM also includes a commodity meter which meters the electricity used in the home. Meter HM may communicate with devices using either WPAN or PLC, with PLC capable devices connected to the home's power grid. The home includes six in-premise devices which may communicate with Meter HM: a thermostat communicating via WPAN, a freezer communicating via PLC, a home alarm system communicating over WPAN, a video camera which monitors a portion of the home and communicates over WPAN, a health monitoring system which may monitor the health of an elderly relative and which communicates over WPAN, and a home entertainment system communicating via WPAN.

Meter HM communicates wirelessly with a utility network using IPv6 communications protocols. The utility network includes other utility nodes and at Access points AP214, AP137 and AP8, as well as a BOS for managing Meter HM. The BOS also includes a customer portal which allows the homeowner to either monitor or control, or both, some or all of the in premise devices.

Access points AP214, AP137 and AP8 each have a /64 allocation of IPv6 addresses. Access point AP137 has allocated a /125 of IPv6 addresses to utility node Meter HM. Meter HM selects addresses from its /125 allocation of IPv6 addresses to assign addresses to the in-premise devise which register with it.

Meter HM assigns addresses to the thermostat communicating via WPAN, the freezer communicating via PLC, the home alarm system communicating over WPAN, the video camera communicates over WPAN, the health monitoring system communicating over WPAN, and the home entertainment system communicating via WPAN. In the event one or more in-premise devices is removed, or unregistered from Meter HM then Meter HM may reassign the network address assigned to the removed or unregistered in-premise device to another in premise device.

Allocation of blocks of addresses to utility nodes may be segregated according to various criteria. For example, different sections of the utility network, geographically or logically, may have address blocks allocated from a subset of available address blocks.

While the above example embodiments had the in-premise devices communicate with a utility node which is assigned to (or installed at) the some premise of the utility node, alternate embodiments may allow in-premise devices to communicate via utility nodes from neighboring premises.

While the above example used continuous blocks of a given size according to CIDR (Classless Inter-domain routing) notation, alternate embodiments could use address blocks of any size, whether continuous or non-continuous.

Transit of Packets from an IPv6 Node Through IPv4 Network

Determination of whether to use "6 to 4" or "6 in 4" communication through an IPv4 network may be made by the access point, the back office system, or another component of the system. Communication between an IPv6 node in the utility network through an IPv4 network may be through either "6 to 4" or "6 in 4" communication, according to the type of node, the type of network, the selected access point, the back office system, the type of message, the contents of the message, the desired security level, etc. For example, for increased security "6 in 4" communication may be used. Note, "6 in 4" communication is often referred to as tunneling, whereas "6 to 4" communication is often referred to as network address translations (NAT) or IPv6 packet encapsulation.

Figure 10:
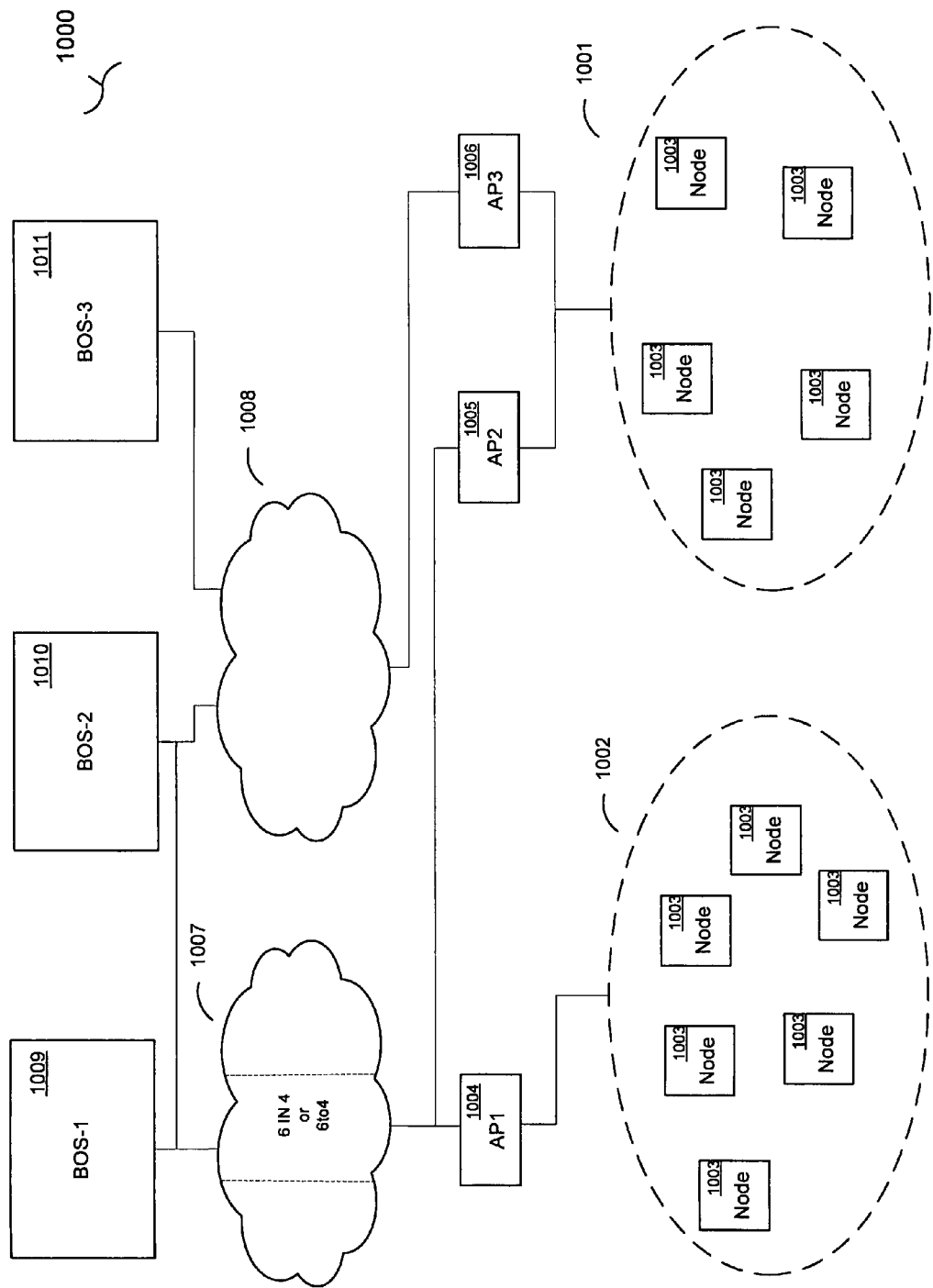
FIG. 10 is a generalized block diagram illustrating a network where and IPv4 tunnel connects an IPv6 LAN to and IPv6 back office system, according to one embodiment of the invention.

FIG. 10 is a generalized block diagram illustrating a network 1000 where an IPv4 tunnel connects an IPv6 LAN to and IPv6 back office system. Network 1000 includes two local area networks 1001 and 1002. LANs 1001 and 1002 include nodes 1003. In the presently preferred embodiment, nodes 1003 are utility nodes. LAN 1002 is connected to access point AP1 1004. LAN 1001 is connected to access points AP2 1005 and AP3 1006. Access point AP1 1004 and access point AP2 1005 connect to communications network 1007. Access point AP3 1006 connects to communications network 1008. In the presently preferred embodiment, communications networks 1007 and 1008 are wide area networks. Back office system BOS-1 1009 connects to WAN 1007. Back office system BOS-2 1010 connects to WAN 1007 and WAN 1008. Back office system BOS-3 1011 connects to WAN 1008.

In the example embodiment, LANs 1001 and 1002 communicate using the IPv6 protocol. Similarly, WAN 1008 utilize the IPv6 communications protocol. Access point AP3 1006, connecting LAN 1001 to WAN 1008, utilizes IPv6. Back office Systems BOS-1 1009, BOS-2 1010 and BOS-3 1101 all utilize the IPv6 communications protocol.

WAN 1007 is an IPv4 network, and does not support IPv6. Access points 1004 and 1005 which connect LAN 1002 and 1001, respectively, to WAN 1007 are capable of communicating using IPv6 and in participating in a mechanism that facilitates transit of IPv6 packets through WAN 1007 to BOS 1009 and 1010, and vice versa.

A message from a node 1003 on LAN 1002, intended for BOS-1 1009 or BOS-2 1010, is sent using and IPv6 address and packet format to access point AP1 1004. AP1 1004 creates and uses an IPv6 tunnel (dynamically or manually configured) through WAN 1007. An IPv6 packet from a node 1003 on LAN 1001 to BOS-2 1010 may route the packet through WAN 1007 or through WAN 1008. If the IPv6 packet is to be routed through WAN 1008, AP3 1006 is used and as WAN 1008 is an IPv6 network, no tunneling, translation or encapsulation need be performed. However, if the packet is routed through WAN 1007, then AP2 1005 is used an the IPv6 packet from node 1003 will either be passed through a "6-in-4" tunnel, as described in Figure, or may be encapsulated in an IPv4 packet for transit through WAN 1007 in a 6 to 4 virtual tunnel, as described below in connection with FIG. 12.

Figure 11:
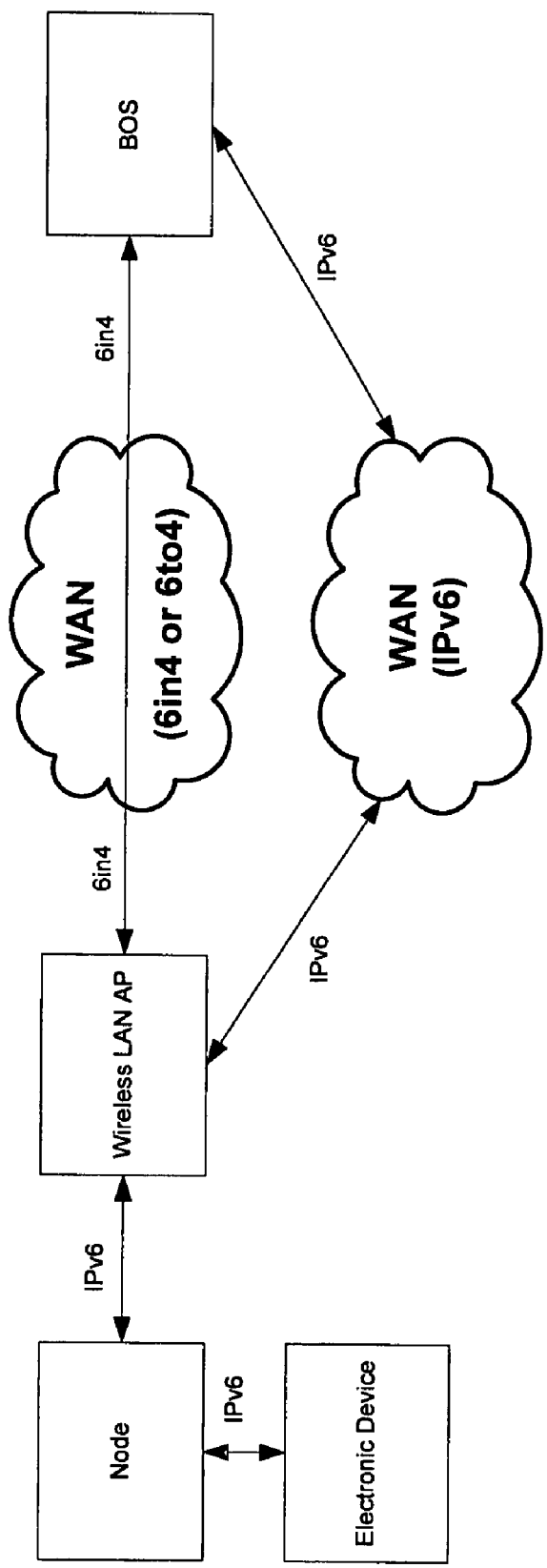
FIG. 11 is a generalized block diagram illustrating packet flow between the access point associated with the IPv6 LAN and the BOS through the IPv4 WAN, according to one embodiment of the invention.

As shown in FIG. 11, packet flow between the access point associated with the IPv6 LAN and the BOS is through the IPv4 WAN.

Figure 12:
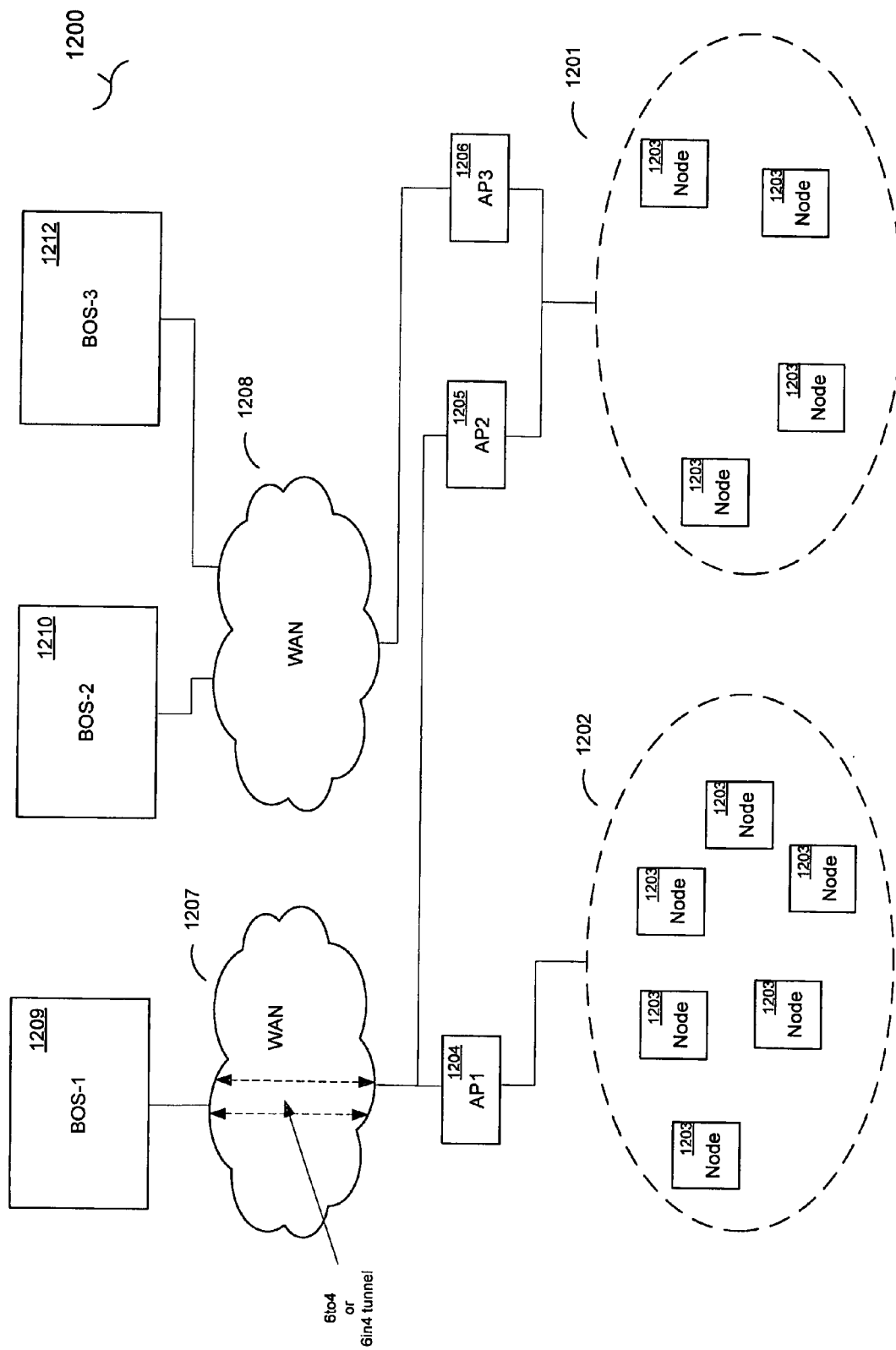
FIG. 12 is a generalized block diagram illustrating a network where IPv6 packets are passed through an IPv4 WAN, according to one possible embodiment.

FIG. 12 is a generalized block diagram illustrating a network 1200 where IPv6 packets are passed through an IPv4 WAN. Network 1200 may include two local area networks 1201 and 1202. LANs 1201 and 1202 include nodes 1203. In the presently preferred embodiment, nodes 1203 are utility nodes. LANs 1201 and 1202 communicate with nodes 1203 using IPv6 protocols and addressing. LAN 1202 is connected to access point AP1 1204. LAN 1201 is connected to access points AP2 1205 and AP3 1206. Access point AP1 1204 and access point AP2 1205 connect to communications network 1207. Access point AP3 1206 connects to communications network 1208. In the presently preferred embodiment, communications networks 1207 and 1208 are wide area networks which communicate using IPv4 protocols and addresses. Back office system BOS-1 1209 connects to WAN 1207. Back office system BOS-2 1210 connects to WAN 1208. Back office system BOS-3 1211 connects to WAN 1208.

A node 1203 on LAN 1201 or 1202 sending a message to one, or more, of the back office systems BOS-1, BOS-2, and BOS-3 must pass through one or more IPv4 WANs 1207 or 1208.

Node 1203 on LAN 1201 or 1202 sends an IPv6 packet using and IPv6 address to the appropriate access point to communicate with the intended back office system. In the event BOS-1 1209 is the intended back office system, AP1 1204 may be used to connect to WAN 1207. AP1 1204 receives the IPv6 packet from node 1203, and may encapsulate the received IPv6 packet in the payload portion of an IPv4 packet. AP1 may have or acquire a global IPv4 address for itself for this purpose. The IPv4 header with Protocol 41 is prepended to the IPv6 packet. An IPv4 address associated with BOS-1 is used in the IPv4 packet with the IPv6 packet as payload (the IPv6 packet is a datagram within the IPv4 packet). The IPv4 address of BOS-1 for the prepended packet header can also be derived from the IPv6 destination address of the encapsulated packet by extracting the 32-bits following the IPv6 destination address' 2002:: prefix. In such an embodiment, the IPv4 source address in the prepended packet is the IPv4 address of AP1. The packet IPv4 packet is then transmitted to BOS-1 1209 through WAN 1207. BOS-1 1209 receives the IPv4 packet, and extracts the encapsulated IPv6 packet. The payload of the IPv6 packet is extracted by the BOS-1 1209. In this manner AP 1 1204 and BOS-1 1209 use a "6 to 4" tunnel translation though IPv4 WAN 1207 without establishing an explicit tunnel.

Alternatively, AP1 1204 receiving the IPv6 packet from node 1203, and encapsulate IPv6 packets within UDP packets for transmission to BOS-1 1209 using WAN 1207. As above, in this manner AP1 1204 and BOS-1 1209 are able to exchange IPv6 packets through IPv4 WAN 1207.

BOS-1 1209 intending to send a message to node 1203 through IPv4 WAN and IPv6 LAN may send an IPv4 packet to AP1 1204 through WAN 1207. AP1 1204 may prepend an IPv6 prefix to the IPv4 address of the packet received from BOS-1 1209 and intended for node 1203, allowing the IPv4 address to be effectively converted for transmitting the received packet over IPv6 LAN 1201.

In yet another alternative embodiment, an IPv6 "explicit tunnel" may be created through one or more IPv4 WANs (or more than one IPv6 tunnels may be created through a given IPv4 WAN) as also discussed above in connection with FIG. 10. For example, Node 1203 on LAN 1201 or 1202 sends an IPv6 packet using and IPv6 address to the appropriate access point to communicate with the intended back office system. In the event BOS-1 1209 is the intended back office system, AP1 1204 may be used to connect to WAN 1207. AP1 1204 receives the IPv6 packet from node 1203, and may establish an IPv6 tunnel (or may access an established IPv6 tunnel) through IPv4 WAN 1207. A tunnel broker (not shown) may establish an IPv6 tunnel through IPv4 WAN 1207. This is a configured tunnel (referred to as 6 in4 tunnel) where the traffic between nodes on either side intended BOS and AP nodes will, in the presently preferred embodiment, always use this tunnel. A configuration script may be exchanged between the access point of the utility network and a back office system in establishing the tunnel through the wide area network. In one preferred embodiments, AP1 1204 establishes the IPv6 tunnel to BOS-1 1209. However, alternate embodiments may have one or more back office systems establish a "6 in 4" tunnel through a WAN to one or more access points. 6 in4 tunnel is a configured tunnel. In alternate embodiments, UDP encapsulation of IPv6 packets may also be used, for example to prevent the transiting packet through WAN1207 is not blocked by any NAT (Network address Translation) device that may be present in WAN1207.

The IPv6 packet IPv4 received by AP1 1204 is transmitted to BOS-1 1209 via the "6 in 4" tunnel through WAN 1207. BOS-1 1209 receives and processes the IPv6 packet. Similarly, BOS-1 1209 may send IPv6 packets to Node 1203 through AP1 1204 using the "6 in 4" tunnel through WAN 1207.

Transit of IPv4 Packets Through an IPv6 Utility LAN Network

Figure 13:
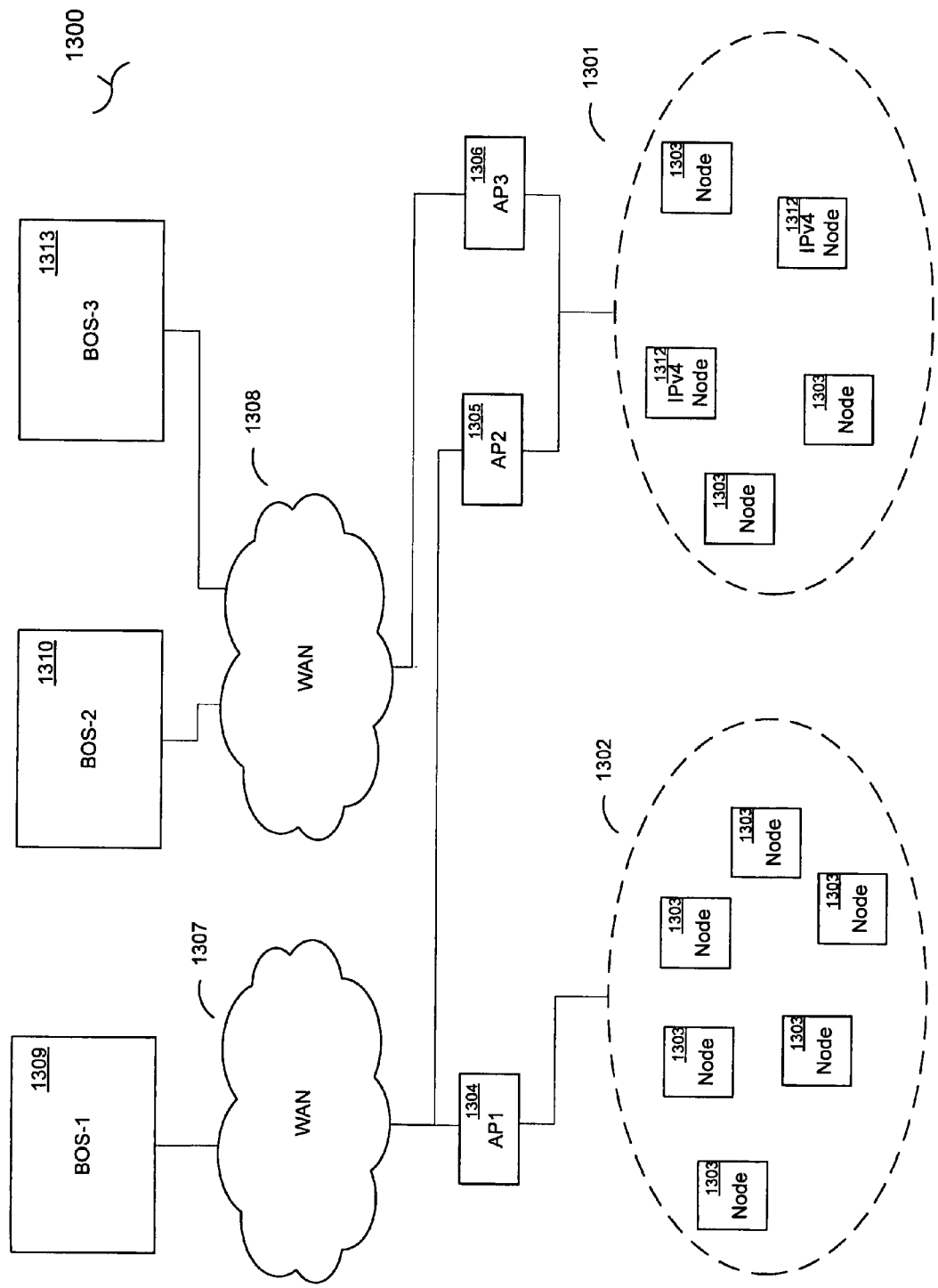
FIG. 13 is a generalized block diagram illustrating a network where IPv4 packets are passed through an IPv6 LAN, according to one possible embodiment.

FIG. 13 is a generalized block diagram illustrating a network 1300 where IPv4 packets are passed through an IPv6 LAN. Network 1300 may include two local area networks 1301 and 1302. LANs 1301 and 1302 include nodes 1303. In the presently preferred embodiment, nodes 1303 are utility nodes. LAN 1302 is connected to access point AP1 1304. LAN 1301 is connected to access points AP2 1305 and AP3 1306. Access point 1304 and access point 1305 connect to communications network 1307. Access point 1306 connects to communications network 1308. In the presently preferred embodiment, communications networks 1307 and 1308 are wide area networks. Back office system BOS-1 1309 connects to WAN 1307. Back office system BOS-2 1310 connects to WAN 1307 and WAN 1308. Back office system BOS-3 1311 connects to WAN 1308.

Nodes 1312 on LAN 1301 are IPv4 nodes which communicate using IPv4, whereas LAN 1301 utilizes IPv6. Node 1312 sending a message to BOS 1310, which connects to LAN 1301 through IPv6 WANs and access points, may be accomplished by node 1312 sending an IPv4 packet on LAN 1301.

Node 1312 sends its IPv4 packet to AP2 for forwarding to BOS-1 1309. In this case, AP2 has the capability to read the destination header in the IPv4 packet but does not reformat the packet; the packet traverses to BOS-1 1309 or BOS-2 1310 over IPv4 WAN 1307; BOS-1 1309 and BOS-2 1310 both have the capability to strip the IPv4 packet, read the source information and the payload; BOS-1 1309 and BOS-2

1310 also generate IPv4 packets intended for IPv4 node 1312 for traverse through WAN 1307, and forwarding to node 1312 by AP2 1305.

In one possible alternative embodiment, AP2 1305 has the capability to map and convert the IPv4 address and headers to IPv6 and also read and map the payload on to IPv6 packet. From then on, the IPv6 packet traverses thru WAN 1307 in a 6 to 4 or 6 in4 tunnels like all other IPv6 packets do; BOS 1309 and BOS 1310 receive and process the reformatted IPv6 packet, and also generate an IPv6 packet in any response to or communication with node 1312. The return IPv6 packet is converted back to IPv4 format by AP2 1305 before it is forwarded to node 1312.

In yet another possible embodiment, the IPv4 packet from node 1312 heading to BOS 1310 or BOS 1311 via IPv6 WAN is converted to IPv6 format by AP2 1305 or AP3 1306, and forwarded to BOS 1310 or BOS 131 1 (in this manner, 6 in4 or 6 to 4 tunneling need not be involved).

The invention has been described with reference to particular embodiments. However, it will be readily apparent to those skilled in the art that it is possible to embody the invention in specific forms other than those of the preferred embodiments described above. This may be done without departing from the spirit of the invention.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A wireless communication system comprising:
    an in-premise network having a first communication protocol;
    an in-premise device connected with said in-premise network, said device communicating with the in-premise network using the first communication protocol;
    a utility network having a second communication protocol that is different than the first communication protocol; and
    a utility node connected with the in-premise network and with the utility network, said utility node being capable of receiving commodity meter information, wherein the utility node is configured to:
        communicate with the in-premise network using the first communication protocol;
        communicate with the utility network using the second communication protocol;
        assign a network address of the utility network to the in-premise device;
        provide the assigned network address to a management portal connected to the utility network;
        receive from the management portal messages addressed with the assigned network address; and
        forward said messages to the in-premise device using the first communication protocol.

2. The wireless network system of claim 1, wherein the in-premise network is wireless personal area network (WPAN) network.

3. The wireless network system of claim 2, wherein the in-premise wireless personal area network (WPAN) network uses the ZigBee communications protocol.

4. The wireless network system of claim 2, wherein the in-premise wireless personal area network (WPAN) network uses the ultra-wideband (UWB) communications protocol.

5. The wireless network system of claim 1, wherein the in-premise network is a power line carrier (PLC) communications network.

6. The wireless network system of claim 1, wherein the in-premise network may use both the ultra-wideband (UWB) communications protocol and a power line carrier (PLC) communications network.

7. The wireless network system of claim 1, wherein the in-premise network may use both the ZigBee communications protocol and a power line carrier (PLC) communications network.

8. The wireless network system of claim 1, wherein the associated network address is an IPv6 network address.

9. The wireless network system of claim 1, wherein the associated network address is an IPv4 network address.

10. The wireless network system of claim 1, wherein the in-premise network uses IP protocols.

11. The wireless network system of claim 2, wherein the WPAN network uses IP protocols.

12. The wireless network system of claim 1, wherein the utility node is configured to proxy the associated network address to the utility network.

13. The wireless network system of claim 1, wherein the utility node is configured to forward IPv6 data packets to a back office system in response to data received from the in-premise device.

14. The wireless network system of claim 1, wherein the utility node is configured to forward IPv4 data packets to a back office system in response to data received from the in-premise device.

15. The wireless network of claim 12, wherein at least one back office system in communication with the utility network is configured to:
    receive the associated network address proxied by the utility node; and
    send at least one message to the in-premise device using the associated network address.

16. The wireless network system of claim 1, wherein the utility node is configured to associate unique network addresses to each of a plurality of in-premise devices.

17. The wireless network system of claim 16, wherein the associated unique network addresses are globally routable.

18. The wireless network system of claim 16, wherein at least one of the plurality of in-premise devices is physically located at a neighboring premise.

19. A method of communicating by a node between an in-premises network having a first communication protocol and a wireless utility network having a second communication protocol that is different than the first communication protocol, said method comprising:
    receiving, from the in-premises network, an indication that at least one in-premise device exists within the in-premises network;
    assigning a utility network address of the utility network to the in-premise device;
    providing the assigned network address to a management portal connected to the utility network;
    receiving from the management portal messages having the assigned network address as a destination;
    forwarding the received messages having the assigned address to the in-premise device using the first communication protocol.

20. The method of claim 19, wherein at least one other node in the utility network is an access point.

21. The method of claim 19, wherein the associated network address is an IPv6 address.

22. The method of claim 21, wherein the in-premise communications network is a wireless personal area network (WPAN) network.

23. The method of claim 22, wherein the WPAN network uses a communication protocol chosen from: the ultra-wideband (UWB) communications protocol, and the ZigBee communications protocol.

24. The method of claim 19, further comprising:
receiving an indication of the existence of a second in-premise device over the in-premise network;
assigning a second network address to the second in-premise device; and
sending an indication of the assignment of the second network address to the second in-premise device to at least one other node in the utility network.

25. The method of claim 24, further comprising:
receiving a message from at least one of the in-premise devices intended for a node on the utility network, wherein the received message was received from the in-premise network;
sending at least one packet on the utility network addressed to the intended node on the utility network, wherein the at least one packet sent includes the associated network address of the at least one of the in-premise device associated with the received message.

26. The method of claim 25, wherein the intended node on the utility network is an access point, the access point forwarding the packet to node on a communication network the access point is in communication with.

27. The system of claim 1, wherein the utility node is configured to:
select the network address for the in-premise device from a set of network addresses allocated to said utility node by said utility network; and
assign the selected network address of the utility network to the in-premise device.

28. The system of claim 1, wherein the in-premise device is one of a pool pump, a freezer, an entertainment system, a home alarm system, a thermostat, a video camera, and a health monitoring system.

29. The system of claim 1, wherein the information forwarded to the in-premise device by the utility node is control information for one or more in-premise devices.

30. The method of claim 19, wherein assigning the utility network address includes:
selecting the network address for the in-premise device from a set of network addresses allocated to said utility node by said utility network; and
assigning the selected network address of the utility network to the in-premise device.

31. The method of claim 19, wherein the in-premise device is one of a pool pump, a freezer, an entertainment system, a home alarm system, a thermostat, a video camera, and a health monitoring system.

32. The method of claim 19, wherein the information forwarded to the in-premise device by the utility node is control information for one or more in-premise devices.

33. The wireless network system of claim 1, wherein the utility node is configured to:
maintain an access control list for the in-premise device, said access control list specifying elements of the utility network allowed to access the in-premise device; and
selectively forward messages addressed with the assigned address to the in-premise device using the first communication protocol based on the access control list.

34. The method of claim 19, wherein the method comprises:
maintaining an access control list for the in-premise device, said access control list specifying elements of the utility network allowed to access the in-premise device; and
selectively forwarding messages addressed with the assigned address to the in-premise device using the first communication protocol based on the access control list.

* * * * *